Sept. 26, 1950  J. W. POTTER  2,523,591
TRACTOR HITCH
Filed May 15, 1947

Inventor
John W. Potter

By Clarence A. O'Brien
and Harvey B. Jacobson
Attorneys

Patented Sept. 26, 1950

2,523,591

UNITED STATES PATENT OFFICE 2,523,591

TRACTOR HITCH

John W. Potter, Byron, Ill.

Application May 15, 1947, Serial No. 748,193

2 Claims. (Cl. 280—33.44)

The present invention relates to new and useful improvements in tractor hitches for coupling a wagon or other trailer to a tractor or other towing vehicle and has for its primary object to provide means for eliminating the necessity of positioning the tractor an exact distance from the trailer in order to accomplish the coupling action.

More specifically the invention embodies the provision of an extensible hitch which may be adjusted to a proper position for coupling a trailer to a tractor together with means for automatically locking the hitch in its extended or adjusted position after the coupling has been completed.

A further object of the invention is to provide a hitch composed of extensible sections together with locking means for the sections of the hitch and which is held against accidental unlocking movement by the pulling force exerted by the tractor on the hitch.

A still further object is to provide a device of this character simple and practical in construction, which is strong and durable, efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
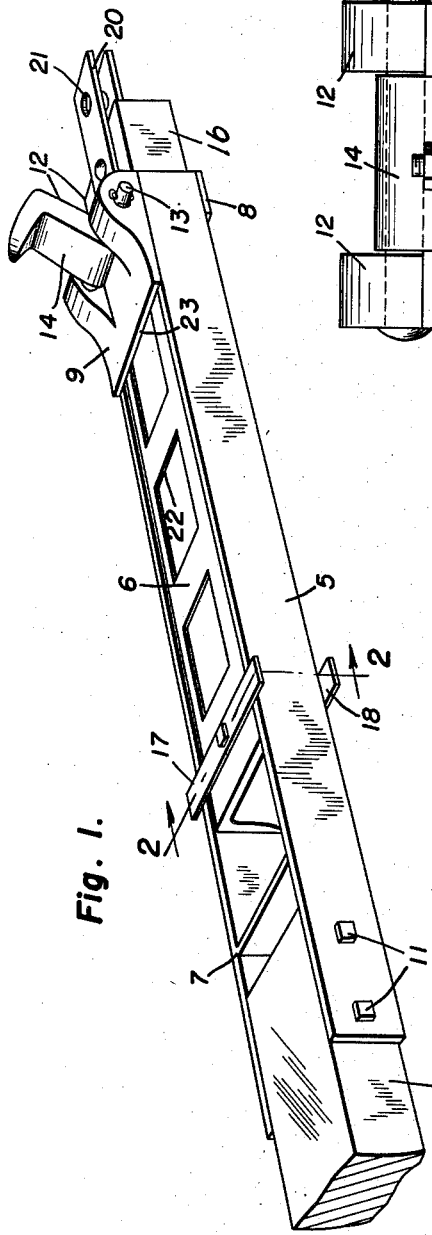
Figure 1 is a perspective view of the hitch.
Figure 2:
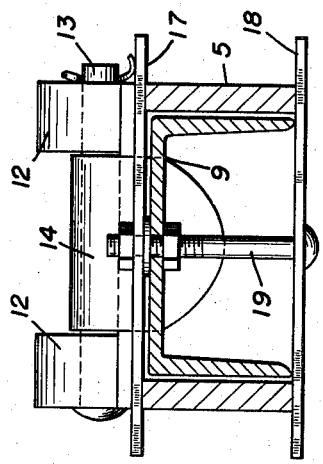
Figure 2 is an enlarged transverse sectional view taken on the line 2—2 of Figure 1.

Referring now to the drawings in detail wherein for the purpose of illustration I have disclosed a preferred embodiment of the invention the numeral 5 designates the rear section of the hitch while the numeral 6 designates the front section thereof. The rear section 5 is constructed of a pair of spaced parallel lonigtudinally extending bars connected to each other adjacent their rear ends by a spacing plate or web 7 and connected at their front ends by a lower transverse plate 8 welded or otherwise suitably secured to the lower edges of the bars and by an upper plate 9 which is likewise welded or otherwise suitably secured to the upper edges of the bars.

A tongue 10 of a wagon or other trailer is positioned between the rear ends of the bars and secured thereto by bolts or the like 11.

Rising from the upper surface of the plate 9 is a pair of spaced parallel ears 12 through which a transversely extending pin 13 is inserted and suitably secured therein and on which a latch 14 is pivotally mounted between the ears 12, the latch being constructed in the form of a hook and including a bill portion 15. The latch 14 is mounted for vertical swinging movement on the plate 9 and with the bill 15 extending in a rearward direction.

The front section 6 of the hitch comprises an inverted channel shaped member 16 which is slidably mounted between the bars of the rear section 5 and slidably supported at the front end of the rear section by the plates 8 and 9. Upper and lower transversely extending plates 17 and 18 are secured to the rear end of the channel member 16 by a bolt 19, the plates 17 and 18 bridging the sides of the rear section 5 and project outwardly at each side of the latter for slidably supporting the rear end of the front section 6 between the sides of the rear section 5 of the hitch.

A clevis 20 projects forwardly from the front end of the front section 6 and is formed with an opening 21 for receiving the coupling pin (not shown) for coupling the hitch to a tractor or other towing vehicle.

In the operation of the device the hitch is first attached to the front end of a tongue 10 and the latch 14 raised and a tractor or other towing vehicle backed into an approximate position for attaching the hitch thereto. The front section 6 is then pulled forwardly to attach the clevis 20 to the tractor and the latch 14 is swung downwardly.

Figure 3:
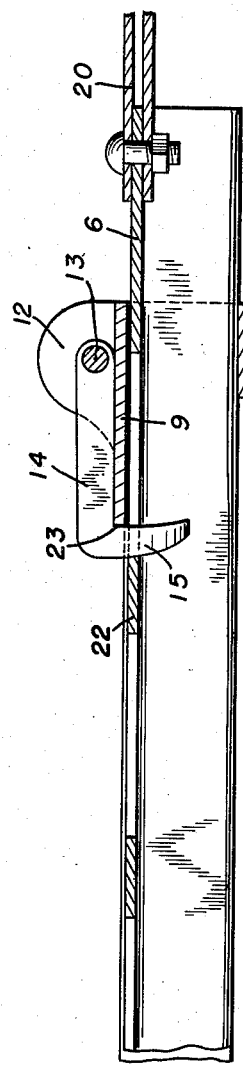
Figure 3 is a fragmentary longitudinal sectional view showing the latch for the sections of the hitch in locked position.

The top of the front section 6 is provided with a plurality of longitudinally spaced openings 22 into which the bill 15 of the latch is received and the forward pulling force inverted on the front section 6 will wedge the bill 15 of the latch in one of the openings 22 as shown in Figure 3 of the drawings. The bill 15 of the latch is constructed so that its inner edge will bear against the rear edge 23 of the plate 9 when the latch is closed in order to relieve strain on the pin 13.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A trailer hitch comprising a pair of parallel longitudinally extending arms secured at one end to a trailer, upper and lower cross bars secured to the other end of the arms, a pair of opposed apertured ears disposed on said upper cross bar, a latch plate pivotally secured between said ears, a depending tongue on said latch plate, an inverted channel bar slidably received between said arms, spaced securing apertures in said channel bar for receiving said latch tongue, lateral guide bars on said channel bar for longitudinal movement on said arms, stop means transversely mounted in said arms for limiting the inner travel of the channel bar and an extending clevis secured to said channel bar for detachable engagement with a draft vehicle.

2. A trailer hitch structure comprising a pair of extensible complementary sections, the first section including a pair of parallel longitudinally extending arms, cross bars on said arms, a pair of opposed apertured ears on one of said cross bars, a pivot pin received in said ears, a latch bar rotatably journalled on said pin and having a latch tongue formed on one of its ends, the second section including an inverted channel bar having spaced openings in the transverse connecting portion thereof to receive said latch tongue, lateral guide bars carried by one end of the channel bar for longitudinal sliding travel on the upper and lower edges of the extending arms of the first section.

JOHN W. POTTER.

REFERENCES CITED

The following references are of record in the file of this patent:

UNITED STATES PATENTS

| Number | Name | Date |
| --- | --- | --- |
| 1,895,992 | Hepburn | Jan. 31, 1933 |
| 2,327,308 | Johnston | Aug. 17, 1943 |
| 2,366,294 | Stringer | Jan. 2, 1945 |
| 2,388,336 | Miller | Nov. 6, 1945 |
| 2,388,923 | Masters | Nov. 13, 1945 |